United States Patent [19]

Yanagi et al.

[11] Patent Number: 5,784,514

[45] Date of Patent: Jul. 21, 1998

[54] APPARATUS AND METHODS FOR OPTICAL COMMUNICATION AND FOR IDENTIFICATION OF OPTICAL FIBER

[75] Inventors: Toru Yanagi; Takeo Seike, both of Yokohama; Isamu Yamasaki, Hiroshima; Toshiso Yoshida, Saeki-gun, all of Japan

[73] Assignees: Sumitomo Electric Industries, Ltd., Osaka; Chudenko Corporation, Hiroshima, both of Japan

[21] Appl. No.: 770,113

[22] Filed: Dec. 20, 1996

[30] Foreign Application Priority Data

Dec. 27, 1995 [JP] Japan ................................. 7-340555

[51] Int. Cl.$^6$ .................................................... G02B 6/255
[52] U.S. Cl. ...................... 385/99; 285/97; 285/98; 285/88; 285/92
[58] Field of Search .......................... 385/95, 96, 97, 385/98, 99, 100, 48, 45, 51, 88, 92

[56] References Cited

U.S. PATENT DOCUMENTS

| | | | |
|---|---|---|---|
| 4,076,375 | 2/1978 | Muska et al. | 385/48 X |
| 4,165,496 | 8/1979 | Di Domenico, Jr. et al. | 385/48 X |
| 4,475,789 | 10/1984 | Kahn | 385/48 X |
| 4,846,545 | 7/1989 | Estabrook et al. | 385/99 X |
| 5,201,019 | 4/1993 | Gallusser et al. | 385/99 |
| 5,471,342 | 11/1995 | Junginger et al. | 385/48 X |

FOREIGN PATENT DOCUMENTS 5-264909 10/1993 Japan ................................. 385/45 X Primary Examiner—Brian Healy
Attorney, Agent, or Firm—Cushman Darby & Cushman IP Group of Pillsbury Madison & Sutro, LLP

[57] ABSTRACT

An apparatus of the present invention is an apparatus for housing a splice reinforcing portion of optical fiber, which comprises (a) a first holding member for holding a splice reinforcing portion for reinforcing a splice between a first optical fiber and a second optical fiber optically connected to the first optical fiber and constituting a light transmission line together with the first optical fiber, and (b) a first photosensor disposed on a side surface of the splice reinforcing portion, receiving leaking light from the splice reinforcing portion, and fixed to the first holding member. Then the apparatus detects the leaking light from the splice reinforcing portion always existing at a splicing site of optical fiber, thereby enabling to perform stable communication free of influence of a covering of optical fiber, enabling to perform long-distance communication, including less risk of damage of optical fiber, disconnection, interruption of operation, and so on, and thus performing optical communication without a need to cut the optical fiber at the splicing site.

15 Claims, 11 Drawing Sheets

APPARATUS AND METHODS FOR OPTICAL COMMUNICATION AND FOR IDENTIFICATION OF OPTICAL FIBER

BACKGROUND OF THE INVENTION

1. Field of the Invention

The present invention relates to an optical communication apparatus and optical communication method for communicating between a station and a splicing site through a fiber-optic line being installed or maintained including such operations as splicing of optical fibers upon constructing communication lines of fiber-optic cables, maintenance of communication lines, and so on, and also to an optical fiber identifying method and optical fiber identifying apparatus for checking conditions of splice between optical fibers.

2. Related Background Art

During installation and maintenance of fiber-optic lines such as splicing of optical fibers, maintenance of fiber-optic lines, and so on, speech communication or the like is indispensable between a station (hereinafter referred to as a center) and a splicing site or between different splicing sites. In the conventional optical cables metal lines enclosed therein were used as a medium of communication line for this purpose, but with trends toward the use of nonmetallic optical cables and trends toward increased distance of relay separation, speech communication or the like through optical fibers became necessary.

For example, a method was developed for putting a light signal directly into the core of an optical fiber to thereby carrying out bidirectional communication.

This direct injection of a light signal into the optical fiber is useful for optical fibers before they are spliced, but cannot be used for existing fiber-optic lines having already been spliced or fiber-optic lines after completion of splicing at splicing sites.

Thus proposed was a non-cut communication method using an apparatus that permits communication between a splicing site and a center without having to cut the optical fiber at a splicing site, as described, for example, in Japanese Laid-open Patent Application No. 5-264909.

FIG. 1 is a schematic drawing of the conventional non-cut communication method. As shown in FIG. 1, an optical cable 901 is installed between a center 921 and another center 941 as center stations, and splicing sites 923 such as manholes are provided midway.

A conventional non-cut optical communication apparatus 942 is set at each splicing site 923. In the non-cut optical communication apparatus 942 a part of the optical fiber 901 is given a curve and a leaking light detector is provided for detecting leaking light from this curved portion of optical fiber 901. Further provided is a pressing device for pressing a part of the optical fiber 901 in accordance with a voice signal from the outside.

Communication between the center 921 and the splicing site 923 is carried out as follows.

For transmission of voice from the center 921 to the splicing site 923, signal light carrying a voice signal is sent from the center 921 into the optical fiber 901. The signal light propagates in the optical fiber 901 to advance through the curved portion of optical fiber 901 in the non-cut optical communication apparatus 942. When the signal light advances through the curved portion of optical fiber 901, leakage of the signal light occurs. This leaking light also carries the voice information. Part of the leaking light is received by the leaking light detector and the voice is reproduced from a photodetection signal. In this way speech is realized from the center 921 to the splicing site 923.

For transmitting voice from the splicing site 923 to the center 921, carrier light (continuous-wave light (CW light) or a train of light pulse having a pulse frequency higher than a frequency of a signal component) for speech is sent from the center 941 into the optical fiber 901. The carrier light propagates in the optical fiber 901 to reach the pressed portion of the optical fiber in the non-cut optical communication apparatus 942. The pressing device presses the pressed portion of optical fiber 901 in accordance with a voice signal from the outside. Press on the optical fiber 901 subjects the carrier light to modulation. The modulation results in intensity-modulating the carrier light, whereby the carrier light through the pressed portion becomes intensity-modulated light carrying the voice information in accordance with the voice signal from the outside. Then the intensity-modulated light carrying the voice information reaches the center 921. In this way speech is realized from the splicing site 923 to the center 921.

SUMMARY OF THE INVENTION

Noting that a splice reinforcing portion always exists at a splicing site of optical fiber, an object of the present invention is to provide an optical communication apparatus and optical communication method permitting stable communication without being affected by covering of optical fiber, permitting long-distance communication, including less risk of damage of optical fiber, disconnection, interruption of operation, or the like, and requiring no cutting of optical fiber at the splicing site.

Further, noting that a splice reinforcing portion always exists at a splicing site of optical fiber, another object of the present invention is to provide an optical fiber identifying apparatus and optical fiber identifying method permitting stable identification of optical fiber without being affected by covering of optical fiber, permitting identification of optical fiber even with a long-distance separation between the splicing site and the center, including less risk of damage of optical fiber, disconnection, interruption of operation, or the like, and requiring no cutting of optical fiber at the splicing site.

The apparatus of the present invention is an apparatus for housing a splice reinforcing portion of optical fiber, which comprises (a) a first holding member for holding a splice reinforcing portion for reinforcing a splice between a first optical fiber and a second optical fiber optically spliced with the first optical fiber and composing an optical transmission line together with the first optical fiber, and (b) a first photosensor disposed on a side surface of the splice reinforcing portion, receiving leaking light from the splice reinforcing portion, and fixed to the first holding member.

It is impossible to achieve perfectly ideal splicing in the case of splicing between the first optical fiber and the second optical fiber by fusion or butting of polished end facets, and occurrence of mismatch is inevitable. Therefore, when light passes a splicing point, part of the light leaks from the core to become leaking light. Then this leaking light reflects the same information as the light signal passing the splice reinforcing portion carries.

In this apparatus the first photosensor detects the leaking light from the splicing point having mismatch of joint in the splice reinforcing portion always existing at the splicing site of optical fiber.

Therefore, regardless of the type of optical fiber and without always having to give a curve to the optical fiber, the communication information carried by the signal light can be received at the splicing site by sending the communication information such as voice information from the center into the optical transmission line.

In the apparatus of the present invention, in the case of the signal light traveling from the first optical fiber to the second optical fiber, the center of a light receiving surface of the first photosensor is preferably located on the second optical fiber side with respect to the splicing point between the first optical fiber and the second optical fiber.

In the case of the signal light traveling from the first optical fiber to the second optical fiber, the most of the leaking light appearing at splice has positively advancing components with respect to the advancing direction of the signal light, and includes only small components scattered backward at the splicing point.

Accordingly, by the arrangement wherein in the case of the signal light traveling from the first optical fiber to the second optical fiber, the center of the light receiving surface of the first photosensor is located on the second optical fiber side with respect to the splicing point between the first optical fiber and the second optical fiber, the first photosensor can receive the leaking light efficiently, so that the leaking light can be detected with maintaining S/N.

In the case of the signal light traveling from the second optical fiber to the first optical fiber, the center of the light receiving surface of the first photosensor is preferably located on the first optical fiber side with respect to the splicing point between the first optical fiber and the second optical fiber.

With the first and second optical fibers constituting the splice reinforcing portion, which is the object to be housed in the apparatus of the present invention, normally, the first optical fiber and a first covering for covering the first optical fiber compose a first fiber-optic cable while the second optical fiber and a second covering for covering the second optical fiber compose a second fiber-optic cable. Then the first covering is stripped off at a first end of the first fiber-optic cable and the second covering is stripped off at the first-optical-fiberside end of the second fiber-optic cable. Then the end facet of the covering-stripped portion of the first optical fiber and the end facet of the covering-stripped portion of the second optical fiber are spliced with each other by fusion splicing or mechanical butting of polished end facets.

The splice reinforcing portion is provided with a reinforcing member surrounding the covering-stripped portion of the first optical fiber and the covering-stripped portion of the second optical fiber and comprised of a transparent member.

There are many types of fiber-optic cables, for example, tape fiber-optic cables of two cores, four cores, eight cores, or twelve cores, single-core fiber-optic cables of the covering size being 0.25 mm, 0.4 mm, 0.6 mm, or 0.9 mm, and cables in the type of fiber-optic overhead ground wires (OPGW). In addition, normally, optical fibers with coverings of different materials or different colors are arranged to constitute a fiber-optic cable.

In the conventional method for detecting the leaking light with curving the optical fiber covered with the covering, light quantities of the leaking light were largely dispersed depending upon the material, the thickness, and the color of covering. This resulted in spending some time for adjustment. No trouble occurs with optical fibers with a gentle curve, but, depending upon the material, the thickness, the color, or the like of covering, a sharp curve is necessitated in order to secure a sufficient quantity of the leaking light, which involves potential risk of damage of optical fiber, disconnection, interruption of operating line, or the like.

In the apparatus of the present invention, the first photosensor detects the leaking light through the reinforcing member, which is a transparent member, from the splicing point having mismatch of joint in the splice reinforcing portion always existing at the splicing site of optical fiber. Therefore, there is no dispersion in the quantity of the leaking light depending upon the material, the thickness, the color, or the like of covering of optical fiber, and thus, the adjustment time for detection of leaking light can be decreased from that heretofore. Since there is no need to give the optical fiber a sharp curve depending upon the material, the thickness, the color, or the like of covering of optical fiber, the risk of damage of optical fiber, disconnection, interruption of operating line, and so on can be decreased.

In the case of the signal light traveling from the first optical fiber to the second optical fiber, the apparatus of the present invention preferably further comprises a second holding member for holding a first part of the first fiber-optic cable, so as to curve a second portion of the first optical fiber between the first holding member and the second holding member.

In this case, the signal light traveling through the first optical fiber travels through the second portion, thus curved, of the first optical fiber. As a result, a guided mode of the signal light before the second portion of the first optical fiber becomes different from that of the signal light after having passed through the second portion. Then the signal light having passed through the second portion of the first optical fiber will have a greater quantity of leaking light when passing the splicing point than that without a curve. Accordingly, a sufficient quantity of leaking light can be secured, so that the leaking light can be detected with suitably maintaining S/N.

In the case of the signal light traveling from the second optical fiber to the first optical fiber, the apparatus preferably further comprises a second holding member for holding a first part of the second fiber-optic cable, so as to curve a second portion of the second optical fiber between the first holding member and the second holding member.

In the case of curving the second portion of the first optical fiber, the first photosensor is preferably positioned on the side surface of the splice reinforcing portion opposite to the center of curvature of the curve of the second portion of the first optical fiber with the optical transmission line inbetween.

The leaking light, having passed through the first optical fiber and thereafter passing the splicing point, tends to advance away from the center of curvature of the curve. Therefore, by the arrangement wherein the first photosensor is positioned on the side surface of the splice reinforcing portion opposite to the center of curvature of the curve of the second portion of the first optical fiber with the optical transmission line inbetween, a sufficient quantity of leaking light can be secured furthermore and the leaking light can be detected with suitably maintaining S/N.

The apparatus of the present invention preferably further comprises a first curvature adjuster for moving the second holding member relative to the first holding member to change the curvature of the curve of the second portion of the first optical fiber.

In the case of curving the second portion of the first optical fiber, the intensity of the leaking light changes depending upon the curvature of the curve. Namely, the quantity of the leaking light decreases with decreasing curvature, while the quantity of the leaking light increases with increasing curvature.

Therefore, by changing the curvature of the curve of the second portion of the first optical fiber by the first curvature adjuster, an appropriate quantity of the leaking light can be secured.

In the apparatus of the present invention, a length of a housing space of the first holding member along the optical-axis direction is preferably longer than a length of the reinforcing portion along the optical-axis direction.

A receiving light quantity of the leaking light on the first photosensor changes depending upon the distance between the curved portion of the first optical fiber and the first photosensor. By the arrangement wherein the length of the housing space of the first holding member along the optical-axis direction is longer than the length of the reinforcing portion along the optical-axis direction and the distance between the curved portion of the first optical fiber and the first photosensor is adjusted when the splice reinforcing portion is held by the first holding member, an appropriate quantity of the leaking light can be secured.

In the apparatus of the present invention, the first holding member is preferably detachable from the reinforcing portion and the second holding member is preferably detachable from its holding portion.

In this case, in the case where there are a plurality of splices between optical fibers, even one apparatus, based on the arrangement wherein the first holding member and second holding member are detachable, can deal with the plurality of splices between optical fibers.

The apparatus of the present invention may further comprise a pressing device for pressing a part of the optical transmission line from the side to effect the modulation on the light traveling through the optical transmission line.

In this case, if the carrier light exists in the optical transmission line, the pressing device presses the pressed portion of the optical transmission line in accordance with a signal carrying information to be transmitted, such as a voice signal from the outside. Press on the optical fiber subjects the carrier light to the modulation. The modulation results in intensity-modulating the carrier light, so that the carrier light through the pressed portion becomes intensity-modulated light carrying the information to be transmitted in accordance with the signal such as the voice signal from the outside. Then the intensity-modulated light carrying the information to be transmitted is transferred to the center or the like. In this way transmission of information is realized from the splicing site to the center or the like.

The apparatus of the present invention may further comprise (c) a third holding member for holding a first part of the second fiber-optic cable, a second portion of the second optical fiber between the first holding member and the third holding member being curved; (d) a second photosensor receiving leaking light from the splice reinforcing portion and fixed to the first holding member; and (e) a processing unit for collecting a first photodetection signal output from the first photosensor and a second photodetection signal output from the second photosensor and determining presence or absence of transmit light and a traveling direction of the transmit light; wherein the first photosensor mainly detects leaking light of first signal light traveling from the first optical fiber to the second optical fiber and the second photosensor mainly detects leaking light of second signal light traveling from the second optical fiber to the first optical fiber.

In this case, the first photosensor mainly detects the first leaking light in a quantity of light according to a quantity of the first signal light traveling from the first optical fiber to the second optical fiber, and the second photosensor mainly detects the second leaking light in a quantity of light according to a quantity of the second signal light traveling from the second optical fiber to the first optical fiber.

Accordingly, based upon combinations of presence or absence of the first signal light with presence or absence of the second signal light, receiving light quantities of the first and second photosensors become as follows.

First, if neither the first signal light nor the second signal light exists, the first and second photosensors receive no leaking light.

Second, if only the first signal light exists, the receiving light quantity of the first photosensor is extremely larger than that of the second photosensor.

Third, if only the second signal light exists, the receiving light quantity of the second photosensor is extremely larger than that of the first photosensor.

Fourth, if both the first signal light and the second signal light exists, the receiving light quantities of the first and second photosensors both are suitably large.

The processing unit collects the first photodetection signal output from the first photosensor and the second photodetection signal output from the second photosensor and analyzes the collection result to determine either one of the above modes, thereby determining presence or absence of transmit light and the traveling direction of the transmit light.

In this way identification of optical fiber can be carried out as keeping the splicing condition of optical fiber as it is.

The center of the light receiving surface of the second photosensor is preferably disposed on the first optical fiber side with respect to the splicing point between the first optical fiber and the second optical fiber.

The signal light traveling through the second optical fiber travels through the second curved portion of the second optical fiber. As a result, a guided mode of the signal light before the second portion of the second optical fiber becomes different from that of the signal light after having passed through the second portion. Then the signal light having passed through the second portion of the second optical fiber comes to have a larger quantity of leaking light when passing the splicing point than that without a curve. Accordingly, a sufficient quantity of leaking light can be secured, so that the leaking light can be detected with suitably maintaining S/N.

The second photosensor is preferably positioned on the side surface of the splice reinforcing portion opposite to the curvature center of the curve of the second portion of the second optical fiber with the optical transmission line inbetween.

After having passed through the second optical fiber, the leaking light, occurring by passage through the splicing point, tends to advance away from the curvature center of the curve. Therefore, by the arrangement wherein the second photosensor is disposed on the side surface of the splice reinforcing portion opposite to the curvature center of the curve of the second portion of the second optical fiber with the optical transmission line inbetween, a sufficient quantity of leaking light can be secured furthermore and the leaking light can be detected with suitably maintaining S/N.

The apparatus is preferably arranged so that the third holding member is moved relative to the first holding member and so that the apparatus further comprises a second curvature adjuster for changing the curvature of the curve of the second portion of the second optical fiber.

An appropriate quantity of the leaking light can be secured by changing the curvature of the curve of the second portion of the second optical fiber by the second curvature adjuster.

An optical communication method of the present invention comprises (a) a first step of holding a splice reinforcing portion by a first holding member, holding a first portion of a first fiber-optic cable by a second holding member, curving a second portion of a first optical fiber between the first holding member and the second holding member, and detecting a first photodetection signal output from a first photosensor, and (b) a second step of removing the first portion of the first fiber-optic cable from the second holding member, thereafter holding a first portion of a second fiber-optic cable by the second holding member, curving a second portion of a second optical fiber between the first holding member and the second holding member, and detecting a second photodetection signal output from the first photosensor.

There are some cases in which the first optical fiber is connected to the center A, the second optical fiber to the center B, and information from the center A and center B needs to be received at the splicing point.

In the optical communication method of the present invention, the first step is effective in efficiently receiving the information from the center A and the second step is effective in efficiently receiving the information from the center B. Therefore, the information from the center A and center B can be received though exclusively in terms of the time.

An optical fiber identifying method of the present invention comprises (a) a first step of holding a reinforcing portion by a first holding member, holding a first portion of a first fiber-optic cable by a second holding member, curving a second portion of a first optical fiber between the first holding member and the second holding member, and detecting a first photodetection signal output from a first photosensor, (b) a second step of removing the first portion of the first fiber-optic cable from the second holding member, thereafter holding a first portion of a second fiber-optic cable by the second holding member, curving a second portion of a second optical fiber between the first holding member and the second holding member, and detecting a second photodetection signal output from the first photosensor, and (c) a third step of determining presence or absence of transmit light and a traveling direction of the transmit light, based on a first receiving light intensity obtained from a detection result of the first photodetection signal and a second receiving light intensity obtained from a detection result of the second photodetection signal.

In the optical fiber identifying method of the present invention, the first step is arranged to mainly detect the first leaking light of the first signal light traveling from the first optical fiber to the second optical fiber and the second step is arranged to mainly detect the second leaking light of the second signal light traveling from the second optical fiber to the first optical fiber.

Accordingly, based on combinations of presence or absence of the first signal light with presence or absence of the second signal light, detected quantities of the leaking light in the first and second steps become as follows.

First, if neither the first signal light nor the second signal light exists, no leaking light is detected in the first and second steps.

Second, if only the first signal light exists, the quantity of the leaking light detected in the first step is extremely larger than that of the leaking light detected in the second step.

Third, if only the second signal light exists, the quantity of the leaking light detected in the second step is extremely larger than that of the leaking light detected in the first step.

Fourth, if both the first signal light and the second signal light exists, the quantities of the leaking light detected in the first and second steps both are suitably large.

Then the third step is arranged to analyze the detection result to select either one of the above modes from a first receiving light intensity obtained from the first photodetection signal attained in the first step and a second receiving light intensity obtained from the second photodetection signal attained in the second step, thereby determining presence or absence of transmit light and the traveling direction thereof.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

The embodiments of the present invention will be described with reference to the accompanying drawings. In the description with the drawings, same elements will be denoted by same symbols and redundant description will be omitted.

(Embodiment 1)

Figure 2:
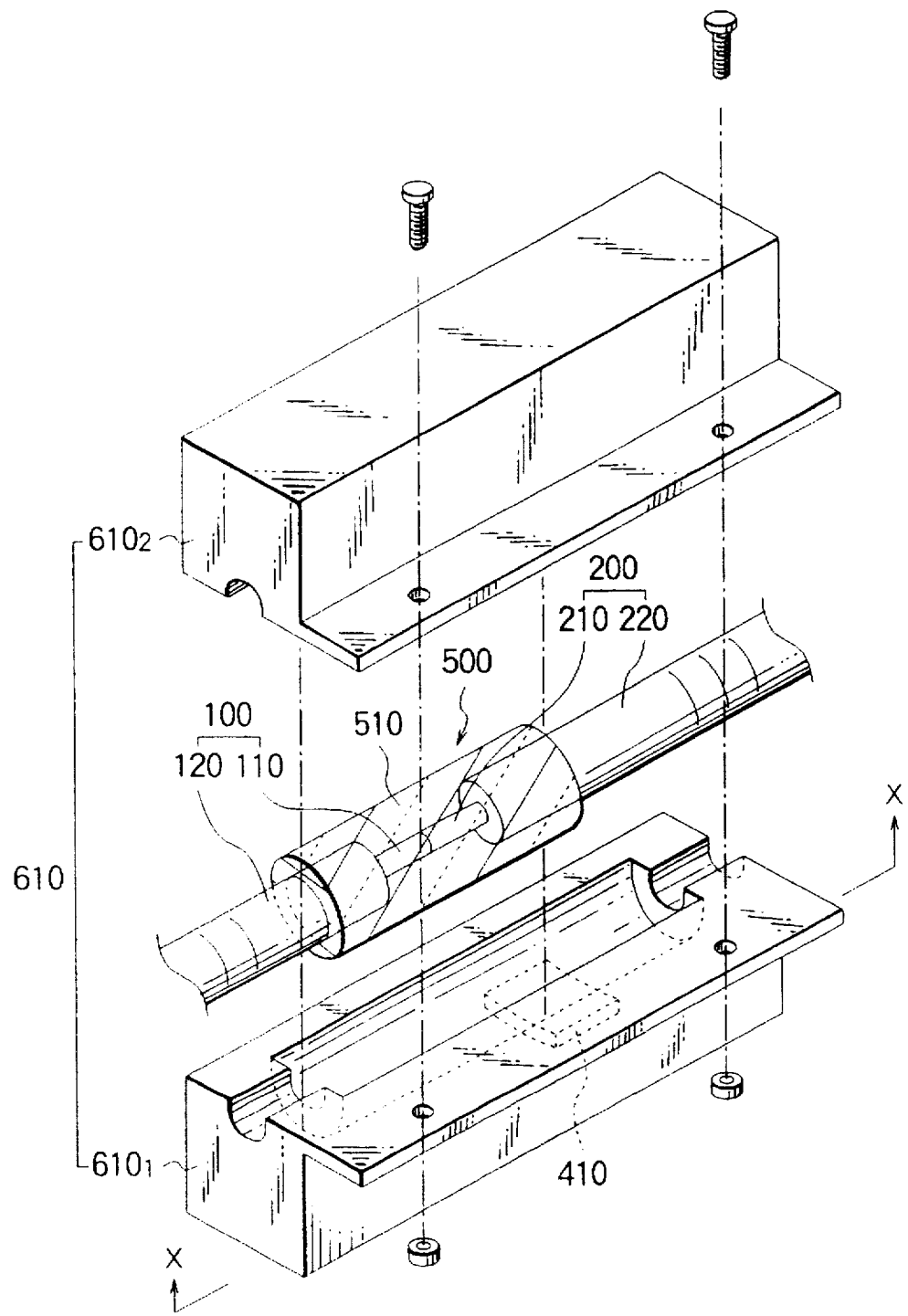
FIG. 2 and 3 are structural drawings to show the apparatus of Embodiment 1 according to the present invention.
Figure 3:
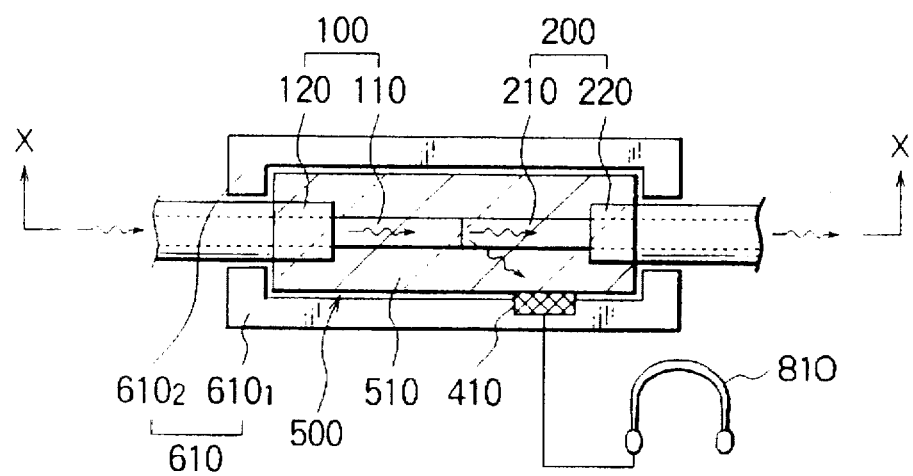

FIGS. 2 and 3 are structural drawings to show Embodiment 1 of the apparatus according to the present invention.

Figure 1:
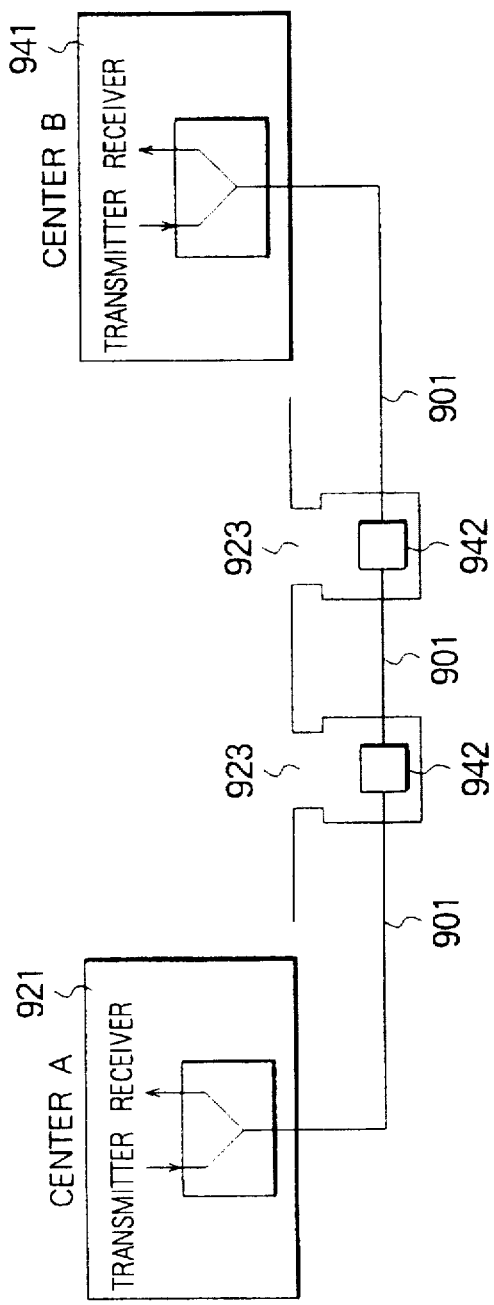
FIG. 1 is an explanatory drawing of the non-cut communication method.

The apparatus of the present embodiment is an apparatus used in place of the non-cut optical communication apparatus 942 in the system of the structure shown in a FIG. 1. FIG. 2 shows a perspective view of the apparatus of this embodiment, and FIG. 3 shows a cross sectional view of the apparatus of this embodiment.

As shown in FIGS. 2 and 3, this apparatus is an apparatus for housing a splice reinforcing portion 500 for reinforcing a splice between an optical fiber 110 and an optical fiber 210, which comprises (a) a holding member 610 for holding the splice reinforcing portion 500 for reinforcing the splice between the optical fiber 110 and the optical fiber 210 optically connected to the optical fiber 110 and constituting an optical transmission line together with the optical fiber 110, and (b) a photosensor 410 disposed on a side surface of the splice reinforcing portion 500, receiving leaking light from the splice reinforcing portion 500, and fixed to a holding member 610.

The optical fiber 110 and a covering 120 for covering the optical fiber 110 compose a fiber-optic cable 100 while the optical fiber 210 and a covering 220 for covering the second optical fiber 210 compose a fiber-optic cable 200. The covering 120 is stripped off at one end of the fiber-optic cable 100 while the covering 220 is stripped off at the end of the fiber-optic cable 200 on the optical fiber 110 side. The end facet of the covering-stripped portion of the optical fiber 110 and the end facet of the covering-stripped portion of the optical fiber 210 are joined with each other by fusion splicing or mechanical butting between polished end facets.

Then the splice reinforcing portion 500 is provided with a reinforcing member 510 surrounding the covering-stripped portion of the optical fiber 110 and the covering-stripped portion of the optical fiber 210 and comprised of a transparent member. The reinforcing member 510 applicable herein is a tube, a transparent resin material, or a combination of a transparent resin material with a tube.

The apparatus of the present invention effectively detects the leaking light of the signal light traveling from the optical fiber 110 to the optical fiber 210.

The signal light traveling through the optical fiber 110 passes via the splicing point to the optical fiber 210 and thereafter travels through the optical fiber 210.

Incidentally, it is impossible to achieve perfectly ideal splicing when the optical fiber 110 and optical fiber 210 are spliced by fusion or butting of polished end facets, and mismatch occurs inevitably. Accordingly, when the light passes by the splicing point, part of the light leaks from the core, and thus, the leaking light appears. This leaking light reflects information carried by the signal light passing the splice reinforcing portion.

In the apparatus of the present embodiment, the photosensor 410 detects the leaking light from the splicing point having mismatch of junction in the splice reinforcing portion always existing at the splicing site of optical fiber. Then an information reproducer 810 such as a headphone for voice information reproduces the information carried by the signal light from the photodetection signal output from the photosensor 410.

There are many types of fiber-optic cables 100, 200. For example, there are tape fiber-optic cables of two cores, four cores, eight cores, or twelve cores, single-core fiber-optic cables of the covering size being 0.25 mm, 0.4 mm, 0.6 mm, or 0.9 mm, and cables of the type of fiber-optic overhead ground wires (OPGW). In addition, normally, optical fibers with coverings of different materials or different colors are arranged to compose the fiber-optic cables 100, 200.

Figure 4:
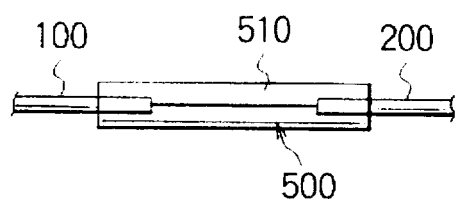
FIGS. 4 and 5 are structural drawings to show structural examples of splicing portion 500.
Figure 5:
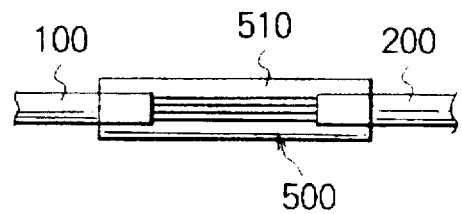

FIGS. 4 and 5 are plan views to show examples of the splice reinforcing portion 500 in the holding member 610.

FIG. 4 shows an example of single-core fiber-optic cable and FIG. 5 shows an example of tape fiber-optic cable.

In the splice reinforcing portion 500 of FIG. 4, the coverings are stripped from the end portions of the two fiber-optic cables to expose the optical fibers 110, 210, which are spliced by fusion. The fusion splicing portion is reinforced by a reinforcing tube 510 of transparent polyethylene or the like. In the splice reinforcing portion 500 of the tape optical fiber of FIG. 5, similarly, the end portions of the two fiber-optic cables are stripped off to expose four optical fibers each, which are spliced separately by fusion and are reinforced by the reinforcing tube 510 of transparent polyethylene or the like.

In the conventional method for detecting the leaking light as curving the optical fiber covered with a covering, quantities of the leaking light are largely dispersed depending upon the material, the thickness, the color, or the like of covering. As a result, the method required a considerable time for adjustment. No trouble would occur as long as the curve of optical fiber is gentle, but, depending upon the material, the thickness, the color, or the like of covering, a sharp curve is necessary in order to secure a sufficient quantity of leaking light, which includes the potential risk of damage of optical fiber, disconnection, interruption of operating line, or the like.

In the apparatus of the present embodiment, the photosensor 410 detects the leaking light through the reinforcing member 510, being a transparent member, from the splicing point having mismatch of junction in the splice reinforcing portion 500 always existing at the splicing site between the optical fiber 110 and the optical fiber 210. Therefore, there exits no dispersion in light quantities of the leaking light depending upon the material, the thickness, the color, or the like of the coverings 120, 220 of optical fibers 110, 210, so that the adjustment time for detection of leaking light can be decreased from that heretofore. Since there is no need to give the optical fiber a sharp curve depending upon the material, the thickness, the color, or the like of the coverings 120, 220 of optical fibers 110, 210, the risk of damage of optical fibers 110, 210, disconnection, interruption of operating line, or the like can be decreased.

Namely, regardless of the type of the fiber-optic cables 100, 200, the communication information carried by the signal light can be received at the splicing site by sending the signal light carrying the communication information such as voice information from the center into the optical transmission line.

In the apparatus of the present embodiment, the center of the light receiving surface of the photosensor 410 is disposed on the optical fiber 210 side with respect to the splicing point between the optical fiber 110 and the optical fiber 210.

In the case of the signal light traveling from the optical fiber 110 to the optical fiber 210, the most of the leaking light appearing at the splicing point has positive traveling components with respect to the traveling direction of the signal light, but small components scattered backward at the splicing point.

Therefore, in the case of the signal light traveling from the optical fiber 110 to the optical fiber 210, by the arrangement wherein the center of the light receiving surface of the photosensor 410 is positioned on the optical fiber 210 side with respect to the splicing point between the optical fiber 110 and the optical fiber 210, the leaking light can be received efficiently by the photosensor 410, so that the leaking light can be detected with maintaining S/N.

In the case of the signal light traveling from the optical fiber 210 to the optical fiber 110, the center of the light receiving surface of the photosensor 410 is preferably disposed on the first optical fiber 110 side with respect to the splicing point between the optical fiber 110 and the optical fiber 210.

In the apparatus of the present embodiment, the length of the housing space of the holding member 610 along the optical-axis direction is set longer than the length of the splice reinforcing portion 500 along the optical-axis direction.

The receiving light quantity of the leaking light on the photosensor 410 changes depending upon the distance in the optical-axis direction between the splicing point between the optical fiber 110 and the optical fiber 210 and the photosensor 410. By the arrangement wherein the length of the housing space of the holding member 610 along the optical-axis direction is set longer than the length of the splice reinforcing portion 500 along the optical-axis direction and wherein the distance along the optical-axis direction between the splicing point and the photosensor is adjusted when the holding member 610 holds the splice reinforcing portion 500, an appropriate quantity of the leaking light can be secured.

In the apparatus of the present embodiment, if the holding member 610 is constructed in such structure as to detachably hold the splice reinforcing portion, the holding orientation shown in FIG. 2 can be reversed for holding the splice reinforcing portion, whereby the leaking light of the signal light traveling from the optical fiber 210 to the optical fiber 110 can be detected properly.

(Embodiment 2)

Figure 6:
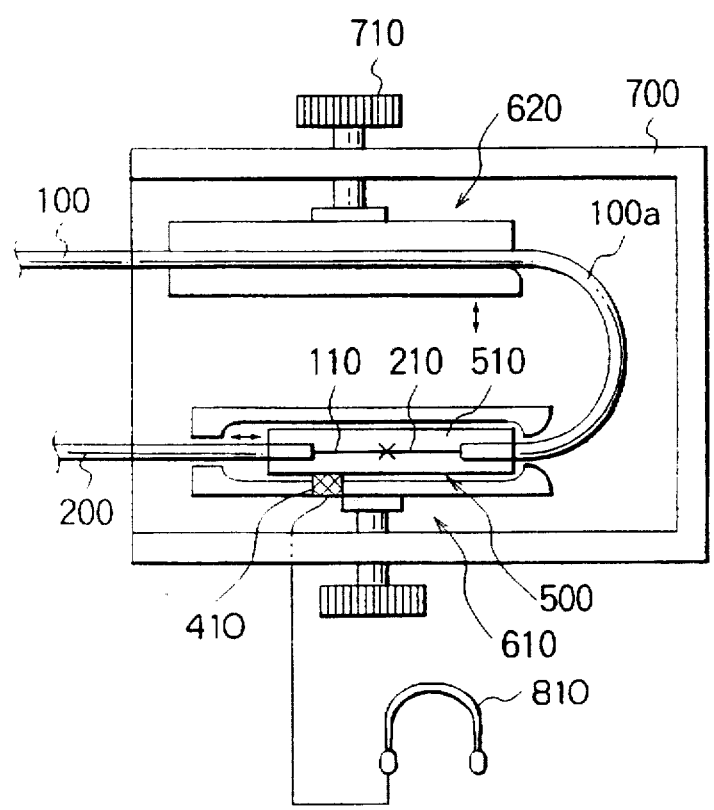
FIG. 6 is a structural drawing to show the apparatus of Embodiment 2 according to the present invention.

FIG. 6 is a structural drawing to show Embodiment 2 of the apparatus according to the present invention. Similarly as the apparatus of Embodiment 1 was, the apparatus of the present embodiment is also an apparatus used in place of the non-cut optical communication apparatus 942 in the system of the structure shown in FIG. 1.

As shown in FIG. 6, this apparatus is an apparatus for housing the splice reinforcing portion 500 for reinforcing the splice between the optical fiber 110 and the optical fiber 210, which comprises (a) the holding member 610 for holding the splice reinforcing portion 500 for reinforcing the splice between the optical fiber 110 and the optical fiber 210 optically connected to the optical fiber 110 and constituting an optical transmission line together with the optical fiber 110, (b) the photosensor 410 disposed on the side surface of the splice reinforcing portion 500, receiving the leaking light from the splice reinforcing portion 500, and fixed to the holding member 610, and (c) a holding member 620 for holding a part of the fiber-optic cable 100. A curve is given to a portion 100a of the fiber-optic cable 100 between the holding member 610 and the holding member 620.

The main body 700 is a casing having at least an aperture on the left side in the drawing, in which the holding member 620 is mounted as slidable vertically in the drawing and the holding member 610 is fixed. The holding member 610 is provided with an insertion groove extending horizontally in the drawing, and the splice reinforcing portion 500 for reinforcing the splice between the optical fiber 110 and the optical fiber 210 is inserted and held in this groove. The left fiber-optic cable from the splice reinforcing portion 500, linearly drawn from the left end of the insertion groove, is an exit-side fiber-optic cable 200.

On the other hand, the right fiber-optic cable 100 from the splice reinforcing portion 500 is drawn from the right end of the insertion groove, then is curved 180°, for example, to form the curved portion 100a of the fiber-optic cable 110, is held by the holding member 620, and then is linearly drawn from the main body 700.

An adjuster screw 710 is set in a threaded hole in the top surface of the main body 700 and is arranged to depress the top surface of the holding member 620 to adjust the vertical position of the holding member 620, thereby adjusting the curvature of the optical fiber curved portion 100a. The holding member 620 can also be arranged to be regulated so as to move only in the vertical directions by a position regulating means not shown. Adjuster screws 710, 720 are provided for effecting minimal curve adjustment so as not to cause interruption of operating line, disconnection, or the like.

In the apparatus of the present embodiment, the signal light traveling through the optical fiber 110 travels through the curved portion 100a of the fiber-optic cable 100. As a result, a guided mode of the signal light before passage through the portion 100a becomes different from that of the signal light after having passed through the curved portion 100a. Then the signal light having passed through the curved portion 100a comes to have a larger quantity of the leaking light when passing by the splicing point than that without a curve. Accordingly, a sufficient quantity of the leaking light can be secured, so that the leaking light can be detected with suitably maintaining S/N.

In the present embodiment the photosensor 410 is positioned on the side surface of the splice reinforcing portion opposite to the curvature center of the curved portion 100a of the fiber-optic cable 100 with the optical transmission line inbetween.

After having passed through the optical fiber 110, the leaking light, appearing by passage through the splicing point, tends to advance away from the curvature center of the curve. Therefore, by the arrangement in which the photosensor 410 is disposed on the side surface of the splice reinforcing portion opposite to the curvature center of the curve of the curved portion 100a of the fiber optic cable 100 with the optical transmission line inbetween, the sufficient quantity of the leaking light can be secured furthermore, so that the leaking light can be detected with suitably maintaining S/N.

In the present embodiment, the adjuster screw 710 is arranged to move the holding member 620 relative to the holding member 610, thereby changing the curvature of the curve of the curved portion 100a of the fiber-optic cable 100.

The intensity of the leaking light changes depending upon the curvature of the curve of the curved portion 100a of the fiber-optic cable 100. Namely, the quantity of the leaking light decreases with decreasing curvature while the quantity of the leaking light increases with increasing curvature.

Accordingly, an appropriate quantity of leaking light can be secured by changing the curvature of the curve of the curved portion 100a by the adjuster screw 710.

The splice reinforcing portion 500 is covered by the reinforcing tube 510 of transparent polyethylene and has a high transmittance of light.

In this way, there is no dispersion in light receiving sensitivity depending upon the type of fiber-optic cable, which stabilizes the light-receiving operation. There is no need to give a local, sharp curve for detection of leaking light, and it becomes easy to receive the light, thus causing no risk of damage on optical fiber 110 and occurrence of disconnection trouble. The non-cut optical fiber identifying apparatus excludes the risk of causing a trouble such as interruption of operating line, disconnection, or the like.

If the reinforcing tube 510 is not transparent but has a light-transmitting property to some extent and if the same reinforcing tube 510 is used for the all splice reinforcing portions 500, the leaking light can be received stably in a predetermined light quantity. If a high tensile strength member such as a stainless steel rod is also used, the splice reinforcing portion should be inserted into the insertion groove so that the high tensile strength member can be prevented from obstructing light reception of photosensor 410. In the case of the tape fiber-optic cables, the splice reinforcing portion is inserted into the insertion groove so that the optical fiber curved portion 100a can be formed along the tape surface.

In the present embodiment, similarly as in Embodiment 1, the apparatus may also be arranged in such structure that the holding member 610 detachably holds the splice reinforcing portion 500 and the holding member 620 detachably holds the portion held thereby.

(Embodiment 3)

Figure 7:
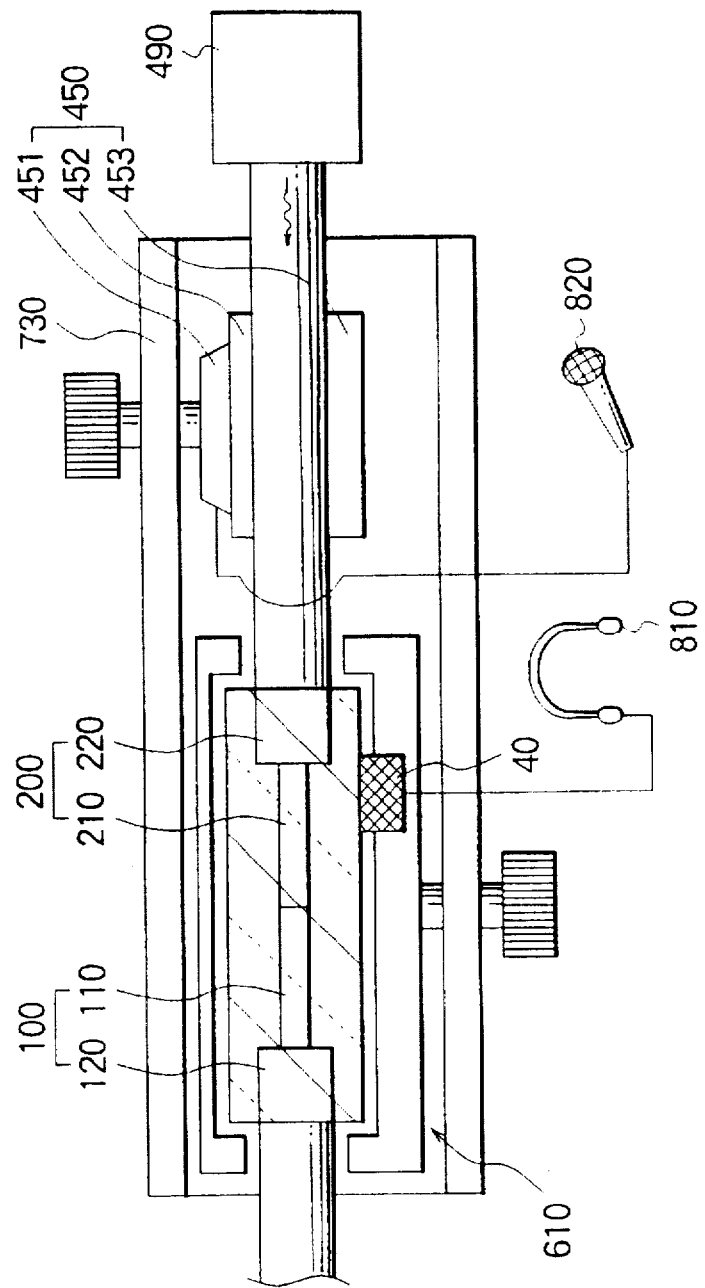
FIG. 7 is a structural drawing to show the apparatus of Embodiment 3 according to the present invention.

FIG. 7 is a structural drawing to show Embodiment 3 of the apparatus according to the present invention. The apparatus of the present embodiment, similarly as in Embodiment 1, is an apparatus used instead of the non-cut optical communication apparatus 942 in the system of the structure shown in FIG. 1.

As shown in FIG. 7, this apparatus is an apparatus for housing the splice reinforcing portion 500 for reinforcing a splice between the optical fiber 110 and the optical fiber 210, which comprises (a) the holding member 610 for holding the splice reinforcing portion 500 for reinforcing the splice between the optical fiber 110 and the optical fiber 210 optically connected to the optical fiber 110 and constituting an optical transmission line together with the optical fiber 110, (b) the photosensor 410 disposed on the side surface of the splice reinforcing portion 500, receiving the leaking light from the splice reinforcing portion 500, and fixed to the holding member 610, (c) a pressing device 450 for pressing the fiber-optic cable 200 being a part of the optical transmission line from the side and effecting the modulation on the light traveling through the optical transmission line, and (d) a carrier light generator 490.

The pressing device 450 comprises (i) a fixed plate 451 fixed to the main body 730, (ii) a vibratory plate 452 for cooperating with the fixed plate 451 to pinch the fiber-optic cable 200 between them, and (iii) a speaker 453 attached to the vibratory plate 452. The speaker is activated according to a voice signal sent from a microphone 820, so as to depress the optical fiber 210 in the fiber-optic cable 200 through the vibratory plate 452. It is also possible to use the vibratory plate of the speaker 453 directly as the vibratory plate 452.

In the apparatus of the present embodiment, when there is the carrier light in the optical transmission line, the pressing device 450 presses the pressed portion of the optical transmission line in accordance with the voice signal from the microphone 820. Press on the optical fiber subjects the carrier light to the modulation. The modulation results in intensity-modulating the carrier light, and the carrier light passing through the pressed portion becomes intensity-modulated light carrying the information to be transmitted in accordance with the voice signal. Then the intensity-modulated light carrying the information to be transmitted is transmitted to the center 921, 941 or the like. In this way, transmission of voice information from the splicing point to the center or the like can be realized.

Figure 8:
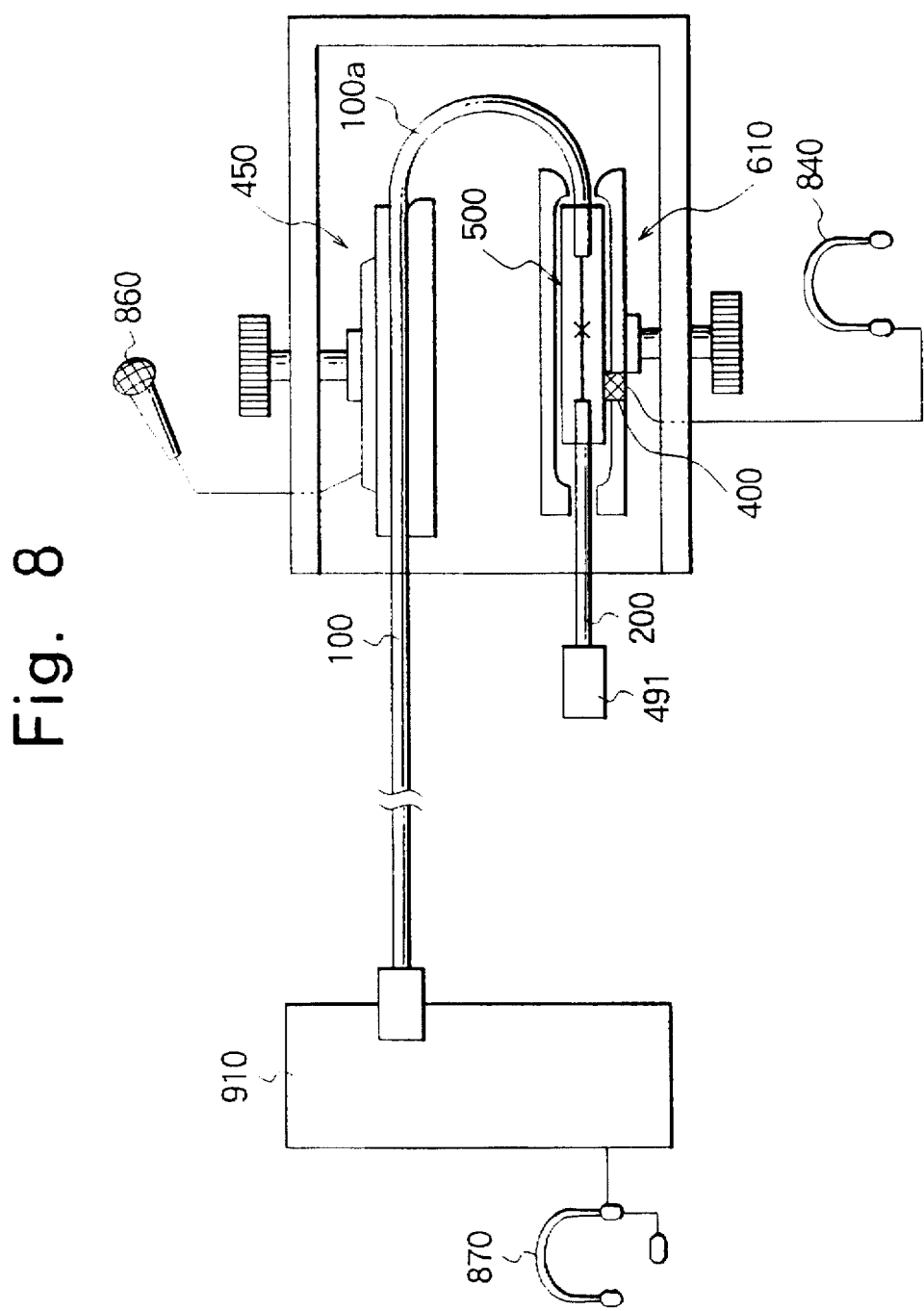
FIGS. 8 to 10 are explanatory drawings to illustrate examples for communication with a master device using modifications of the apparatus of Embodiment 3.
Figure 9:
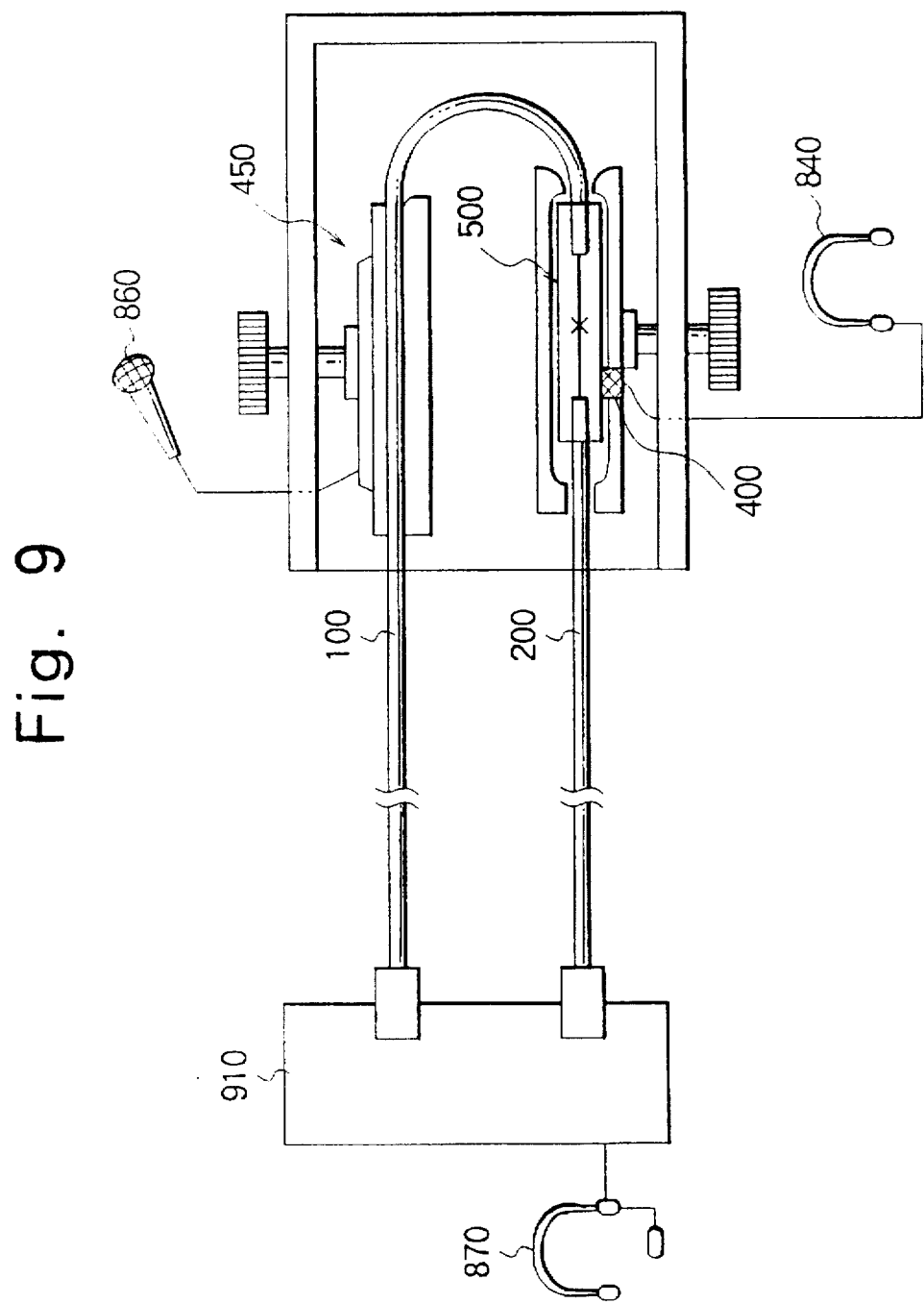
Figure 10:
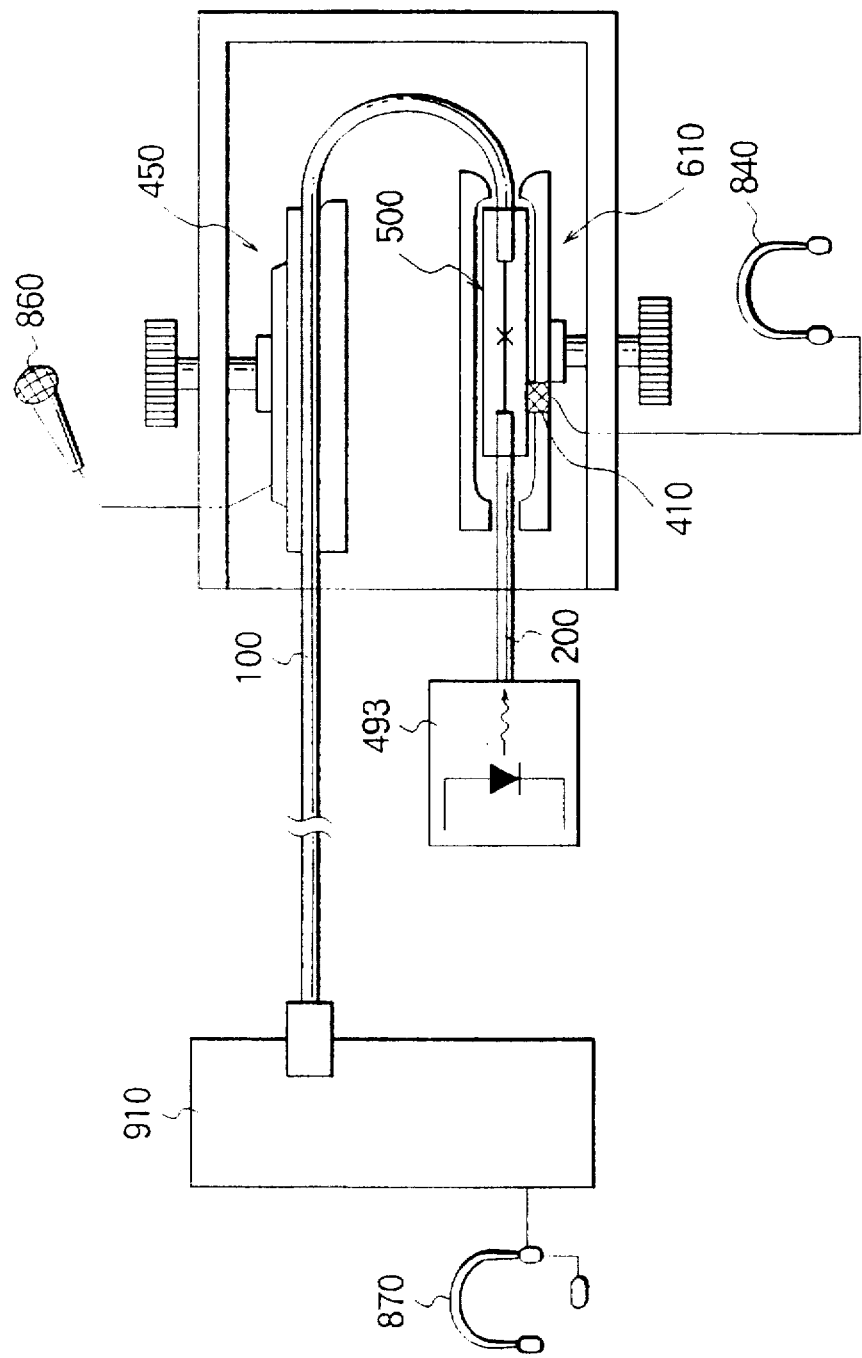

FIGS. 8 to 10 are explanatory drawings to illustrate examples to realize speech using modifications of the apparatus of FIG. 7. In each apparatus in the examples shown in FIGS. 8 to 10, the pressing device 450 also has the function of the holding member 620 in the apparatus of FIG. 6. Although the number of cores in the optical cable and installation environment differ depending upon the purpose or application of optical communication, the three types of arrangements shown in FIGS. 8 to 10 can be used selectively depending upon the circumstances of working site. According to experiments using a prototype model, the maximum speech range was approximately 80 km in optical line, which was able to cover all ordinary optical relay separations.

In the first example shown in FIG. 8, a reflector 491 is attached to the terminal end of a single-line optical fiber to be used for reply speech with reflected light. The carrier light from a master unit 910 is sent into the fiber-optic cable 100 to be received by a receiver 840. Further, the carrier light passing is reflected by the reflector 491, and the carrier light thus reflected is modulated by a voice signal from a transmitter 860, thereby permitting reception and speech by a transmitter-receiver 870 of the master unit 910. The speech range was short distances, and experiments showed the limit of about 10 km.

In the second example shown in FIG. 9, two-line optical fibers are used to realize reply speech by loop connection. The carrier light from the master unit 910 is sent into the fiber-optic cable 100 to be loop-connected to another optical fiber 28 at the turn splicing point P, whereby light modulated by a voice signal from the transmitter 860 is put on the carrier light to send a reply to the master unit 910. The speech range was about 40 km.

In the third example shown in FIG. 10, a single-line optical fiber is used to send the carrier light from the both ends thereof. A light-source unit 493 for emitting the carrier light independently is connected to the terminal end of the line. Speech from the master unit 910 is made by modulating the carrier light from the master unit 910, while speech to the master unit 910 is made by modulating the carrier light from the light-source unit 493 by the pressing device 450. The Speech range was about 80 km.

(Embodiment 4)

Figure 11:
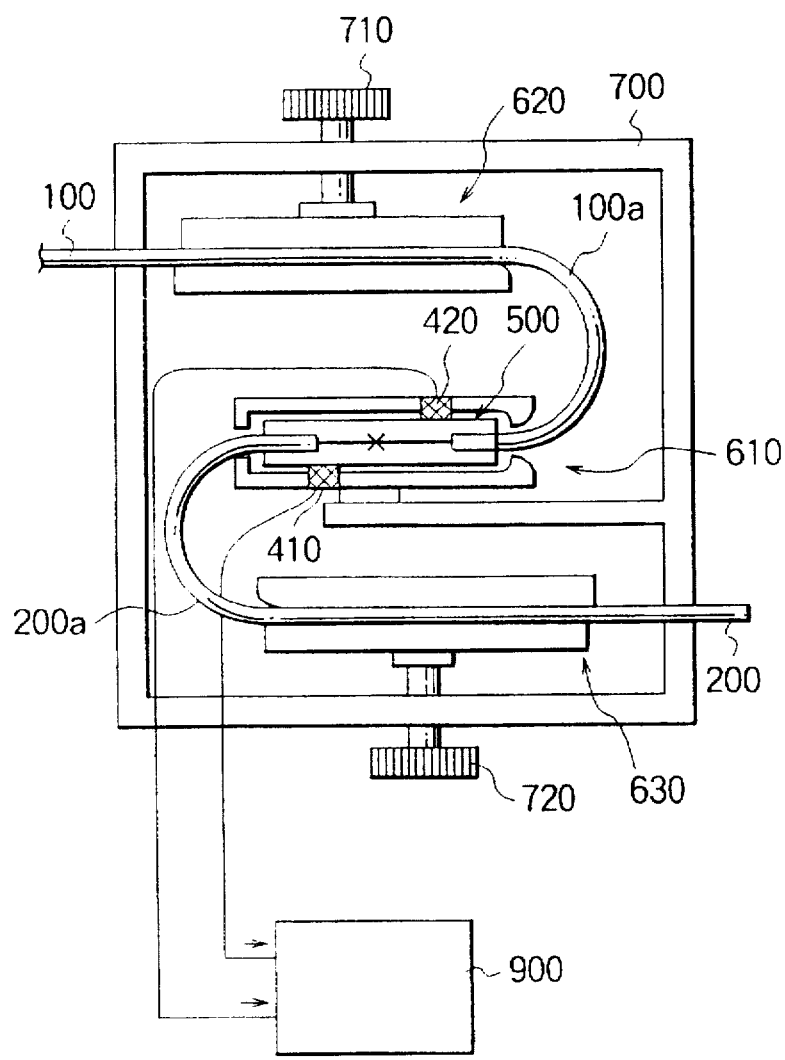
FIG. 11 is a structural drawing to show the apparatus of Embodiment 4 according to the present invention.

FIG. 11 is a structural drawing to show Embodiment 4 of the apparatus according to the present invention. As shown in FIG. 11, this apparatus comprises (a) the holding member 610 for holding the splice reinforcing portion 500 for reinforcing the splice between the optical fiber 110 and the optical fiber 210 optically connected to the optical fiber 110 and constituting an optical transmission line together with the optical fiber 110, (b) the photosensor 410 disposed on the side surface of the splice reinforcing portion 500, receiving the leaking light from the splice reinforcing portion 500, and fixed to the holding member 610, (c) the holding member 620 for holding a part of the fiber-optic cable 100, (d) a holding member 630 for holding a part of the fiber-optic cable 200, (e) a photosensor 420 disposed on the side surface of the splice reinforcing portion 500, receiving the leaking light from the splice reinforcing portion 500, and fixed to the holding member 610, and (f) a processing unit 900 for collecting a first photodetection signal output from the photosensor 410 and a second photodetection signal output from the photosensor 420 and determining presence or absence of transmit light and a traveling direction of the transmit light. A curve is given to a portion 100a of the fiber-optic cable 100 between the holding member 610 and the holding member 620, and a curve is given to a portion 200a of the fiber-optic cable 200 between the holding member 610 and the holding member 630. The photosensor 410 mainly detects the first leaking light of the first signal light traveling from the optical fiber 110 to the optical fiber 210 while the photosensor 420 mainly detects the second leaking light of the second signal light traveling from the optical fiber 210 to the optical fiber 110.

In the apparatus of the present embodiment, the photosensor 410 mainly detects the first leaking light in a light quantity according to a light quantity of the first signal light traveling from the optical fiber 110 to the optical fiber 210, while the photosensor 420 mainly detects the second leaking light in a light quantity according to a light quantity of the second signal light traveling from the optical fiber 210 to the optical fiber 110.

Accordingly, depending upon combinations of presence or absence of the first signal light with presence or absence of the second signal light, receiving light quantities of the photosensor 410 and photosensor 420 become as follows.

First, if neither the first signal light nor the second signal light exists, the photosensor 410 and photosensor 420 receive no leaking light.

Second, if only the first signal light exists, the receiving light quantity of the photosensor 410 is extremely larger than that of the photosensor 420.

Third, if only the second signal light exists, the receiving light quantity of the photosensor 420 is extremely larger than that of the photosensor 410.

Fourth, if both the first signal light and the second signal light exists, the receiving light quantities of the photosensor 410 and photosensor 420 both become suitably large.

The processing unit 900 collects the first photodetection signal output from the photosensor 410 and the second photodetection signal output from the photosensor 420 and analyzes the results thus collected to select either one of the above modes, thereby determining presence or absence of transmit light and a traveling direction thereof.

In this way, identification of optical fiber can be carried out with maintaining the splice condition of optical fiber.

In the present embodiment, the center of the light receiving surface of the photosensor 420 is positioned on the optical fiber 110 side with respect to the splicing point between the optical fiber 110 and the optical fiber 210. Accordingly, a sufficient quantity of the leaking light can be secured, so that the leaking light can be detected with suitably maintaining S/N.

Further, the photosensor 420 is disposed on the side surface of the splice reinforcing portion 500 opposite to the curvature center of the curve of the curved portion of the optical fiber 210 with the optical transmission line inbetween.

Accordingly, a sufficient quantity of the leaking light can be secured, so that the leaking light can be detected with suitably maintaining S/N.

By moving the holding member 630 relative to the holding member 610, the curvature of the curve of the curved portion 200a of the fiber-optic cable 200 can be adjusted by the adjuster screw 720. Therefore, by changing the curvature of the curve of the curved portion 200a by the adjuster screw 720, an appropriate quantity of leaking light can be secured.

(Embodiment of Optical Communication Method)

Figure 12:
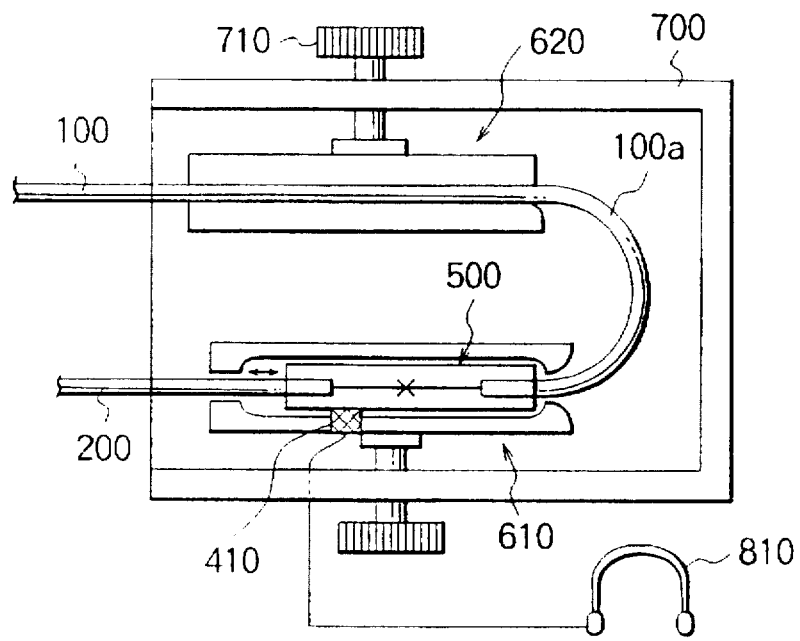
FIGS. 12 and 13 are explanatory drawings to show an embodiment of the optical communication method according to the present invention.
Figure 13:
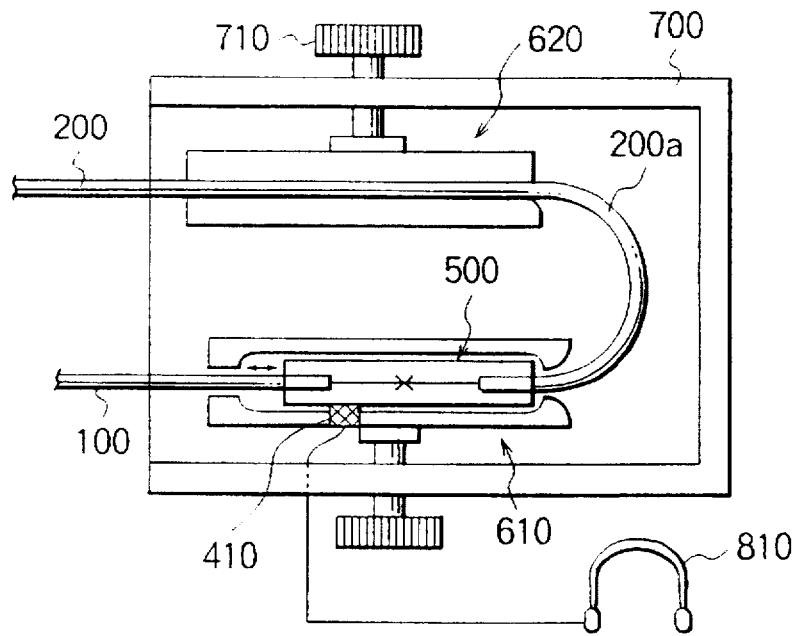

FIGS. 12 and 13 are explanatory drawings to show an embodiment of the optical communication method according to the present invention. The present embodiment employs the apparatus shown in FIG. 6.

First, the holding member 610 holds the splice reinforcing portion 500, the holding member 620 holds a part of the fiber-optic cable 100, a part 100a of the fiber-optic cable 100 is curved between the holding member 610 and the holding member 620, and the first photodetection signal output from the photosensor 410 is detected (see FIG. 12).

Next, the splice reinforcing portion 500 is removed from the holding member 610, thereafter the optical-axis direction is reversed to make the holding member 610 hold the splice reinforcing portion 500 in the reverse direction, the fiber-optic cable 100 is removed from the holding member 620, thereafter the fiber-optic cable 200 is held by the holding member 620, the portion 200a of the fiber-optic cable 200 is curved between the holding member 610 and the holding member 620, and the second photodetection signal output from the photosensor 410 is detected (see FIG. 13).

In the case wherein the optical fiber 110 is connected to the center A, the optical fiber 210 to the center B, and information from the center A and center B needs to be received, the information from the both center A and center B can be received in accordance with the aforementioned procedures though exclusively in terms of the time.

(Embodiment of Optical Fiber Identifying Method)

Figure 14:
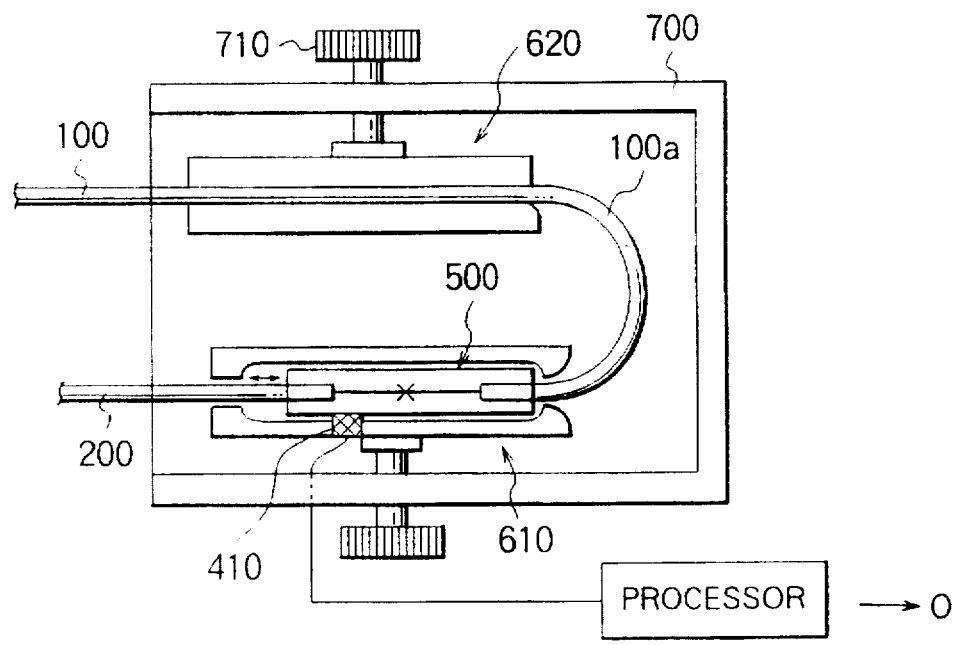
FIGS. 14 and 15 are explanatory drawings to show an embodiment of the optical fiber identifying method according to the present invention.
Figure 15:
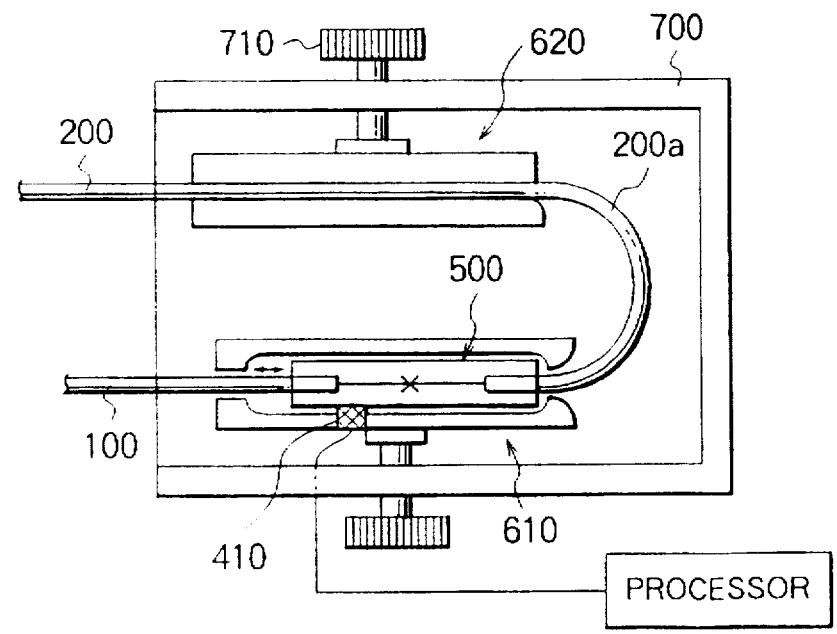

FIGS. 14 and 15 are explanatory drawings to show an embodiment of the optical communication method according to the present invention. The present embodiment employs the apparatus shown in FIG. 6.

First, the splice reinforcing portion 500 is held by the holding member 610, a part of the fiber-optic cable 100 is held by the holding member 620, a portion 100a of the fiber-optic cable 100 is curved between the holding member 610 and the holding member 620, and the first photodetection signal output from the photosensor 410 is detected (see FIG. 14; the first step).

Then mainly detected is the first leaking light of the first signal light traveling from the optical fiber 110 to the optical fiber 210.

Next, the splice reinforcing portion 500 is removed from the holding member 610, thereafter the optical-axis direction is reversed to hold the splice reinforcing portion 500 in the reverse direction by the holding member 610, the fiber-optic cable 100 is removed from the holding member 620, thereafter the fiber-optic cable 200 is held by the holding member 620, the portion 200a of the fiber-optic cable 200 is curved between the holding member 610 and the holding member 620, and the second photodetection signal output from the photosensor 410 is detected (see FIG. 15; the second step).

Then mainly detected is the second leaking light of the second signal light traveling from the optical fiber 210 to the optical fiber 110.

Subsequently, determined based on a first receiving light intensity obtained from the detection result of the first photodetection signal and a second receiving light intensity obtained from the detection result of the second photodetection signal, are presence or absence of transmit light and a traveling direction thereof (the third step).

Depending upon combinations of presence or absence of the first signal light with presence or absence of the second signal light, detection quantities of the leaking light in the first and second steps become as follows.

First, if neither the first signal light nor the second signal light exists, no leaking light is detected in the first and second steps.

Second, if only the first signal light exists, the quantity of the leaking light detected in the first step is extremely larger than that of the leaking light detected in the second step.

Third, if only the second signal light exists, the quantity of the leaking light detected in the second step is extremely larger than that of the leaking light detected in the first step.

Fourth, if both the first signal light and the second signal light exists, the quantities of the leaking light detected in the first and second steps both become suitably large.

Then, in the third step, analysis is carried out to select either one of the above modes from the first receiving light intensity obtained from the first photodetection signal collected in the first step and the second receiving light intensity obtained from the second photodetection signal collected in the second step, thereby determining presence or absence of transmit light and a traveling direction thereof.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 340555/1995 filed on Dec. 27, 1995 is hereby incorporated by reference.

What is claimed is:

1. An apparatus for housing a splice reinforcing portion of optical fiber, comprising:
   - a first holding member for holding a splice reinforcing portion for reinforcing a splice between a first optical fiber and a second optical fiber optically connected to said first optical fiber and constituting an optical transmission line together with said first optical fiber; and
   - a first photosensor disposed on a side surface of said splice reinforcing portion, receiving leaking light from said splice reinforcing portion, and connected to said first holding member;
   - wherein at least one of said first and second optical fibers has a curved portion adjacent to said splice reinforcing portion.

2. An apparatus according to claim 1, wherein the center of a light receiving surface of said first photosensor is positioned on the side of said second optical fiber with respect to the splice between said first optical fiber and said second optical fiber.

3. An apparatus for housing a splice reinforcing portion of optical fiber, comprising:
   - a first holding member for holding a splice reinforcing portion for reinforcing a splice between a first optical fiber and a second optical fiber optically connected to said first optical fiber and constituting an optical fiber; and
   - a first photosensor disposed on a side splice reinforcing portion, receiving leaking light from said splice reinforcing portion, and connected to said first holding member,
   - wherein said first optical fiber and a first covering for covering said first optical fiber constitute a first fiber-optic cable and said first covering is stripped from a first end of said first fiber-optic cable,
   - wherein said second optical fiber and a second covering for covering said second optical fiber constitute a second fiber-optic cable, said second covering is stripped from an end of said second fiber-optic cable on the side of said first optical fiber, and an end facet of a covering-stripped portion of said first optical fiber is spliced with an end facet of a covering-stripped portion of said second optical fiber, and
   - wherein said splice reinforcing portion is comprised of a transparent member for surrounding the covering-stripped portion of said first optical fiber and the covering-stripped portion of said second optical fiber.

4. An apparatus according to claim 3, further comprising:
   - a second holding member for holding a first portion of said first fiber-optic cable,
   - wherein a second portion of said first optical fiber is curved between said first holding member and said second holding member.

5. An apparatus according to claim 4,
   - wherein said first photosensor is disposed on the side surface of said splice reinforcing portion opposite to the curvature center of the curve of the second portion of said first optical fiber with said optical transmission line inbetween.

6. An optical communication apparatus according to claim 4, further comprising a first curvature adjuster for moving said second holding member relative to said first holding member to change a curvature of the curve of the second portion of said first optical fiber.

7. An apparatus according to claim 4, wherein a length of a housing space of said first holding member along a direction of the optical axis is longer than a length of said splice reinforcing portion along the direction of the optical axis.

8. An optical communication apparatus according to claim 4, wherein said first holding member detachably holds said splice reinforcing portion and said second holding member detachably holds the portion held thereby.

9. An optical communication apparatus comprising:
   - a first holding member for holding a splice reinforcing portion for reinforcing a splice between a first optical fiber and a second optical fiber optically connected to said first optical fiber and constituting an optical fiber;
   - a first photosensor disposed on a side splice reinforcing portion, receiving leaking light from said splice reinforcing portion, and connected to said first holding member; and
   - a pressing device for pressing a portion of said optical communication line from a side surface thereof to effect modulation on light traveling through said optical transmission line.

10. An apparatus according to claim 4, further comprising:
    - a third holding member for holding a first portion of said second fiber-optic cable, wherein a second portion of said second optical fiber is curved between said first holding member and said third holding member;
    - a second photosensor receiving leaking light from said splice reinforcing portion and fixed to said first holding member; and
    - a processing unit for receiving a first photodetection signal output from said first photosensor and a second photodetection signal output from said second photosensor and determining presence or absence of transmit light and a traveling direction of said transmit light;
    - wherein said first photosensor mainly detects leaking light of the first signal light traveling from said first optical fiber to said second optical fiber and said second photosensor mainly detects leaking light of the second signal light traveling from said second optical fiber to said first optical fiber.

11. An apparatus according to claim 10, wherein the center of a light receiving surface of said second photosensor is disposed on the side of said first optical fiber with respect to the splice between said first optical fiber and said second optical fiber.

12. An apparatus according to claim 10, wherein said second photosensor is disposed on a side surface of said splice reinforcing portion opposite to the curvature center of the curve of the second portion of said second optical fiber with said optical transmission line inbetween.

13. An optical communication apparatus according to claim 10, further comprising a second curvature adjuster for moving said third holding member relative to said first holding member to change a curvature of the curve of the second portion of said second optical fiber.

14. An optical communication method using the optical communication apparatus as set forth in claim 8, comprising:

a first step of holding said splice reinforcing portion by said first holding member, holding the first portion of said first fiber-optic cable by said second holding member, curving the second portion of said first optical fiber between said first holding member and said second holding member, and detecting a first photodetection signal output from said first photosensor; and a second step of removing the first portion of said first fiber-optic cable from said second holding member, thereafter holding a first portion of said second fiber-optic cable by said second holding member, curving a second portion of said second optical fiber between said first holding member and said second holding member, and detecting a second photodetection signal output from said first photosensor.

15. An optical fiber identifying method using the optical communication apparatus as set forth in claim 8, comprising:

a first step of holding said splice reinforcing portion by said first holding member, holding the first portion of said first fiber-optic cable by said second holding member, curving the second portion of said first optical fiber between said first holding member and said second holding member, and detecting a first photodetection signal output from said first photosensor;

a second step of removing the first portion of said first fiber-optic cable from said second holding member, thereafter holding a first portion of said second fiber-optic cable by said second holding member, curving a second portion of said second optical fiber between said first holding member and said second holding member, and detecting a second photodetection signal output from said first photosensor; and a third step of determining presence or absence of transmit light and a traveling direction of said transmit light, based on a first receiving light intensity obtained from a detection result of said first photodetection signal and a second receiving light intensity obtained from a detection result of said second photodetection signal.

* * * * *